(12) United States Patent
Ham et al.

(10) Patent No.: US 7,979,900 B2
(45) Date of Patent: Jul. 12, 2011

(54) METHOD AND SYSTEM FOR LOGGING INTO AND PROVIDING ACCESS TO A COMPUTER SYSTEM VIA A COMMUNICATION NETWORK

(75) Inventors: Mason L. Ham, Southwest Harbor, ME (US); Ajay Bhatnager, Maiden, MA (US); Scott Maxwell, Gloucester, MA (US)

(73) Assignee: Alphawolf Consulting, Inc., Newton, MA (US)

( * ) Notice: Subject to any disclaimer, the term of this patent is extended or adjusted under 35 U.S.C. 154(b) by 1602 days.

(21) Appl. No.: 10/477,764

(22) PCT Filed: May 29, 2002

(86) PCT No.: PCT/US02/16675
§ 371 (c)(1),
(2), (4) Date: Nov. 14, 2003

(87) PCT Pub. No.: WO02/098039
PCT Pub. Date: Dec. 5, 2002

(65) Prior Publication Data
US 2004/0158743 A1     Aug. 12, 2004

(51) Int. Cl.
*G06F 21/00* (2006.01)
*G06F 7/04* (2006.01)
*G06F 15/16* (2006.01)
*H04L 29/06* (2006.01)

(52) U.S. Cl. .......................................... 726/8; 713/183

(58) Field of Classification Search .................. 713/183; 726/8, 3, 4, 6, 7
See application file for complete search history.

(56) References Cited

U.S. PATENT DOCUMENTS 6,052,785 A * 4/2000 Lin et al. ............................ 726/5
6,182,142 B1 * 1/2001 Win et al. ...................... 709/229
2002/0055997 A1 * 5/2002 Pinnell ........................ 709/224

* cited by examiner

*Primary Examiner* — Kambiz Zand
*Assistant Examiner* — Aubrey H Wyszynski
(74) *Attorney, Agent, or Firm* — Ohlandt, Greeley, Ruggiero & Perle, L.L.P.

(57) ABSTRACT

A method and system for logging into and providing access to multiple computer systems via the Internet or other communications network using a single authenticating process (e.g. username and password).

7 Claims, 8 Drawing Sheets

301
User access signoff Web page

302
User selects and submits "signoff" option

303
Browser transmits signoff request through network to login server

304
Login server processes signoff request

305
Login server sends signoff instructions to browser

306
Browser executes signoff instructions and sends out individual signoff instructions to each private server 307
Each private server receives signoff request and internally notes user is now signed off

Fig. 3

18-a
18a-1
Username:
18a-2
Password:
18a-3
Submit

Fig. 4A 18-b

Invalid username/password.

Please try again.

Fig. 4B 18-c

You have successfully logged in!

Click here to sign out

Fig. 4D

METHOD AND SYSTEM FOR LOGGING INTO AND PROVIDING ACCESS TO A COMPUTER SYSTEM VIA A COMMUNICATION NETWORK

TECHNICAL FIELD

The present invention relates to a computer method and system for logging into and providing access to a computer system via a communications network, and more particularly, to a method and system for allowing a user to log into and obtain access to multiple computer systems by provided a single username and password which is provided only one time per session.

BACKGROUND OF THE INVENTION

A common problem for computer systems is the control of access to different computers through a network. This control is useful for a number of reasons. For example, access control can be used as a means of identifying a user or resource within a computer system so that certain data can be presented to that specific resource or user. Another example of access control may be to only allow certain resources or individuals to be able to access particular information stored on a computer system.

One implementation of access control is through the use of authentication information. Prior to allowing access to certain information, a computer system requests authentication information from the user or resource making the information request. For example, one form of authentication information can be a username and password pair. A username and password are created and stored on a computer system. When a user wishes to access the computer system, the user must input (e.g., type) this username and password combination into the computer system through a user-interface (e.g., keyboard, browser, electronic card reader). The computer system then matches the information as inputted by the user against the information previously stored in the computer system's database. If the user inputs a username/password combination that matches a username/password combination as stored in the computer system's database, the computer system considers the user authenticated and allows the user access to data on the computer system. The username/password pair is just one example of a way of authenticating a user or resource. For example, instead of a username/password, a resource might need to provide a number, a text string, or some other information. This access control is particularly important when using a large number of computers on an network, where sharing data between different computers allows for an increased amount of services and functionality.

The Internet comprises a vast number of computers and computer networks that are interconnected through communication links. The interconnected computers exchange information using various services, such as electronic mail, Gopher and the World Wide Web ("WWW"). The WWW services allows a server computer system (i.e., Web server or Web site) to send graphical pages of information and other data ("Web pages") to a remote client computer system. A particular Web page may be set up as accessible by anyone on the WWW, a "Public page". Alternatively, the publisher of Web page may restrict access to a particular Web page ("Private Page") and only allow access to a Private Page upon certain authentication, such as requiring the user to provide a username and password. Then, depending on whether authentication is required, or such proper authentication is provided, the remote client computer system can then display the Web pages. Each resource (e.g., computer or Web pages) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is then forwarded to the Web server that supports the Web page. When that Web server receives the request, it sends that Web page to the client computer system. In the case of a private page, the Web server first determines whether or not the client computer system is properly authenticated, and only then does it send the page. When the client computer system receives that Web page, it typically displays the Web page using a browser. A browser is a special-purpose application program that effects the requesting of Web pages and the displaying of Web pages.

SUMMARY OF THE INVENTION

In accordance with the teachings of this invention, there is disclosed a method of permissioning at least one client to access via a network at least one of a plurality of computer systems by the use of an access control system. The method comprises the steps of receiving a client request including a password and directed to a selected one of the plurality of computer systems, processing the received request as to whether the one client is authenticated or not to access information held by the selected one computer system and, if the one client is not authenticated, transmitting a message from the one computer system via the network to the client requesting the client to communicate with the access control system and to obtain authentication. Thereafter, a communication bearing the client's password is received via the network from the client to the access control system, whereby the received client communication is processed to determine whether the access control system had previously received the transmitted client's password. If the access control system had previously received the client password, the access control system provides and transmits an authentication message via the network to the client to be redirected to the one computer system, whereby the one computer system receives and processes the authentication message to permit the client access to information held by the one computer system.

BRIEF DESCRIPTION OF THE DRAWINGS

The following drawings are provided to facilitate an understanding of the nature and operation of this invention:

FIG. 3 illustrates a flow diagram that enables single-signoff for a resource (e.g., a user); and FIGS. 4A to 4D illustrate various webpages that are used by this invention to prompt the input of specified data by the client.

DESCRIPTION OF THE INVENTION

Figure 1:
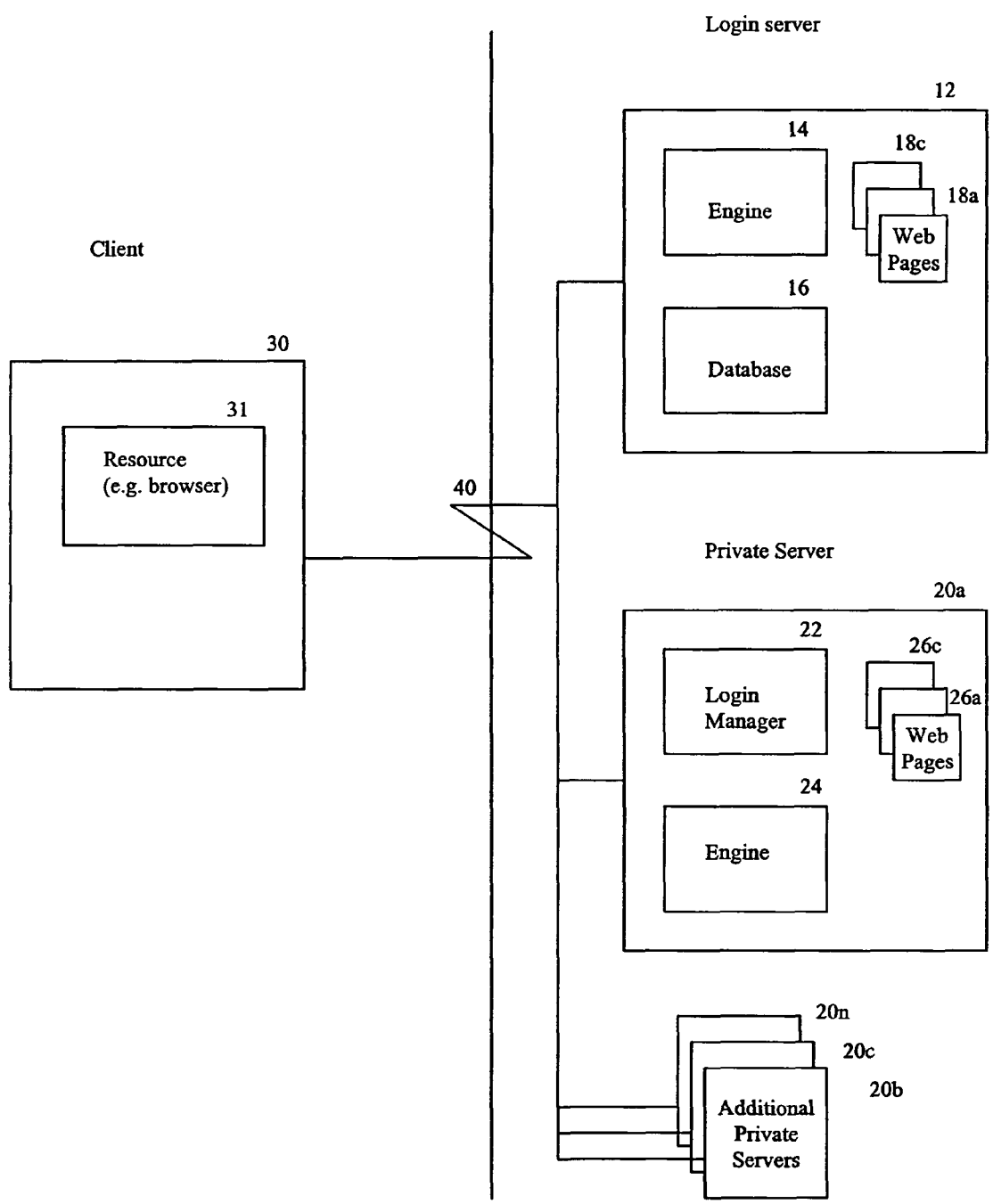
FIG. 1 is a functional block diagram showing the relationship of the login-server to the private servers and the client in accordance with the teachings of this invention.

The present invention provides a method and system for logging into and out of and providing access to a computer system via a communications network through a single-login system 10 as shown in FIG. 1. FIG. 1 is a block diagram illustrating an embodiment of the single-login system 10 which supports the single-login to a login server 12 over a network 40, which in one illustrative embodiment takes the form of the Internet using the World Wide Web. In turn, the login server 12 comprises a login server engine 14, a user database 16, and various Web pages 18a, b and c. The single-login system 10 also comprises a plurality of private server systems 20a-n, each of which includes a login manager 22, a private server engine 24 and a plurality of web pages 26a-c.

Each user initially wishing to use the login server 12 to access different computers or servers over the network 40 must first be set up in the login server 12. In one illustrative application of the single-login system 10, this set-up occurs as follows. A user, through a web browser or client 30, interfaces with the login server 12 through the network 40. Through Web pages 18a-c, the user creates an account comprised of the authentication information (e.g., a username and password) as selected by the user. The user can also enter personal information (e.g., postal address, phone number, email address, etc.), which is then stored in the login database 16 along with the username and password. The user also indicates to the login server 12 what, if any, of his or her personal information, he or she permits to be disclosed to specific private servers 20a-n. All of this information is encrypted and stored in the login database 16.

For example, assume that a user on a browser client 30 wishes to access private server 20a. When the user attempts to access information stored on private server 20a, the private server 20a generates a request as to whether the user on the client system 30 has provided a proper username and password. This request is sent from private server 20a, through the network 40, via client system 30, to the login server engine 14. The login server engine 14 process the request as follows. If the user has provided such information, the login server engine 14 sends back an answer to the private server 20a confirming that the user has entered a proper username and password and is authenticated. The login server 12 also makes available to the private server 20a a properly authenticated user's profile data as stored on the login user database 16. Private server 20a makes requests, through the login manager 22, through client system 30, to the login server 12, to verify that the user is authenticated and to write all user profile information.

One skilled in the art would appreciate that the single-login technique can be used in various environments other than the Internet. For example, single-login can be used on any communication network and for any resource requiring authentication. Examples include the login of appliances, cell phone or a cable television tuner box on a communications network. The single-login system of the present invention reduces the number of user names and passwords a user must have to access multiple computer systems from many to single username/password pair. The single-login system 10 also reduces the frequency at which a user must provide his/her user names and passwords to multiple computer systems from many times to a single time per session. The login server system 10 also allows for a single action on the part of the user to log off of all of the private servers 20a-n previously logged into. The login system also allows for each of private servers 20a-n to store its own custom-defined data, which is stored with and associated with a particular user's profile within the login database 16.

Figure 2A:
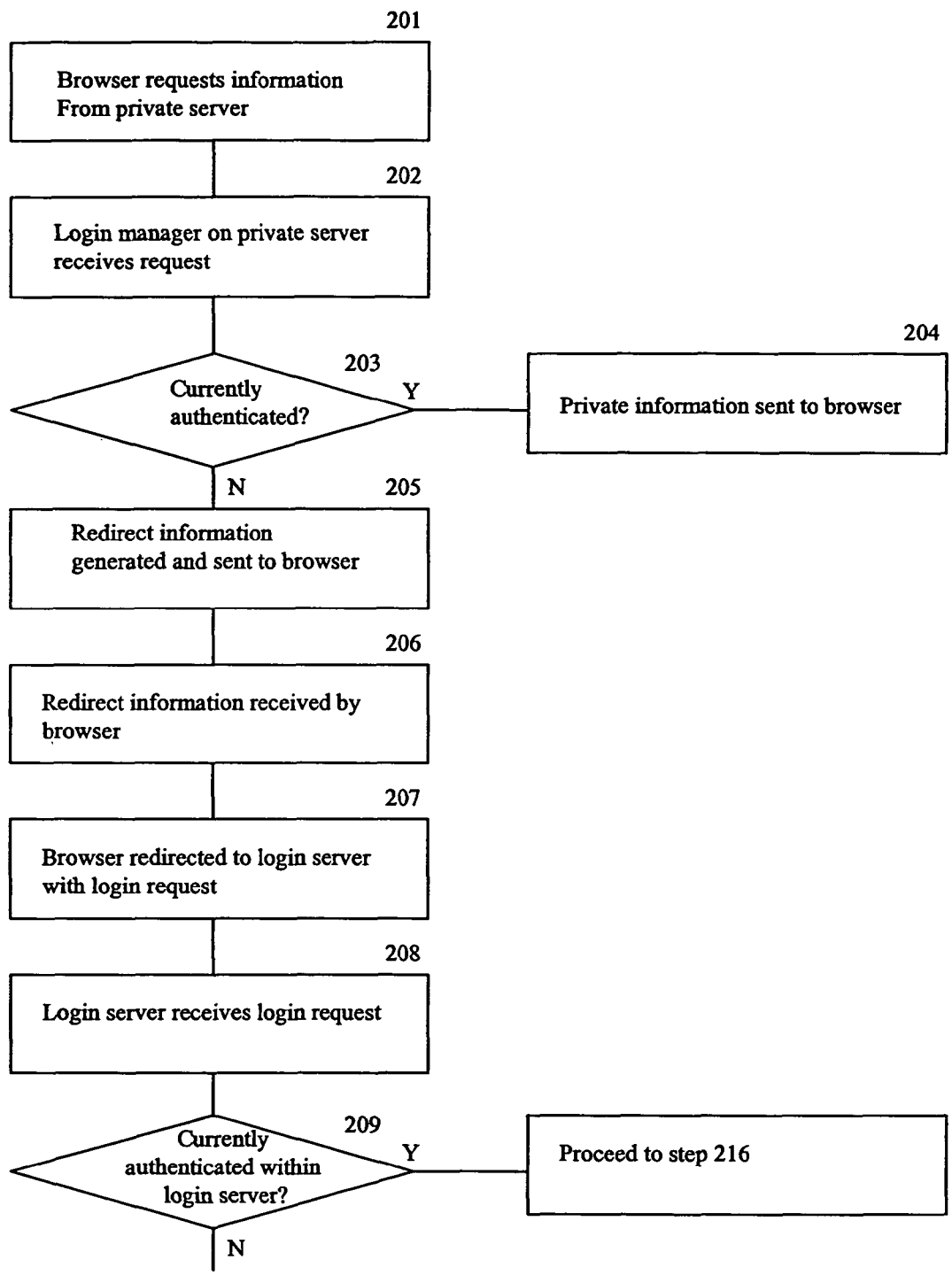
FIGS. 2A and 2B show a flow diagram of the process that enables single-login for a resource (e.g., a user)

FIGS. 2A and B show a flow diagram of the process that enables single-login for a resource (e.g., a user). To enable single-logon, the login database 16 (FIG. 1) must be setup with information regarding a user. In this example, a user's account comprises of authenticating information (a username and password) and personal profile data (e.g., the user's address, phone number, etc.) as well as access privileges to the private information (e.g., what entities or private servers 20a-c are permitted to receive which pieces of a user's personal profile data). The authentication information, personal profile data and access privileges can be created by the user and stored on the login server database 16. Once set up, the login server 12 works as follows. In step 201 as shown in FIG. 2A, a resource, in this example a user, on its browser 31 on a client system 30, sends a request to one of the private servers 20a-n, assume private server 20a, to receive private information. In step 202, the private server 20a receives the user's request for private information. The private server 20a is programmed with a program called the login manager 22 (FIG. 1) to process the requests as follows. In step 203, the login manager 22 checks within the private server 20a to see if a flag has been set indicating that the browser 31 is currently authorized to receive private information as the result of an earlier successful login for this particular user. If this flag indicates a proper earlier authentication from the login server 12, step 204 is initiated, i.e., the private server 20a responds to the request by sending the requested information through the network 40 (FIG. 1) to the browser 30 for viewing or access by the user. If the login manager 22 determines that that this flag has not been set, step 205 is initiated. In step 205, the private server 20a, having determined that the user is not authenticated to receive private information, redirects the user's browser 31 to the login server 12 (FIG. 1). This is done by sending information from the private server 20a to the browser 31 with instructions to the browser 31 to send a request through the network 40 to the login server 12. Along with the instructions for redirection, the private server 20 also includes additional information to be forwarded as part of the redirection. This information will be used by the login server 12 to properly process the user's login. This information "redirect information" includes:

A unique identification number identifying one of the private servers 20a-n, in the present example, private server 20a.

The return address of the private server 20a-n, in the present example, private server 20a, that initiated the request.

Optional customization data that is used to change the appearance of the login web pages 18a-c as presented by the login server 12.

In step 206, the browser 31 receives the redirect request along with the redirect information. In step 207, the browser 31 processes the redirect request by sending a login request through the network 40 from the browser 31 to the login server 12. The redirect request also contains a unique session identifier. This session identification number is a number that is assigned to the browser 31 upon its first connection to the login server 12. This unique session identifier is built into the features of the protocol used by the WWW. In step 208, the login server 12 receives the login request from the browser 31 along with the redirect information and the unique session ID. In step 209, the login server 12 processes the login request by searching the login database 16 (FIG. 1) for a user profile that contains the same session identification as used by the login request as forwarded with the redirect information. If the browser 31 has previously provided authentication information (e.g., username and password) to the login server 12, the login server 12 has already saved that unique session ID in the login server database 16 and matched it with the user's profile. So, if the login server 12 matches a unique session ID as forwarded with the redirect information, with the same unique Session ID stored with a profile in the login database 16, the login server 12 sets an internal flag indicating that the browser 31 has previously been authenticated and proceeds to step 216.

Figure 2B:
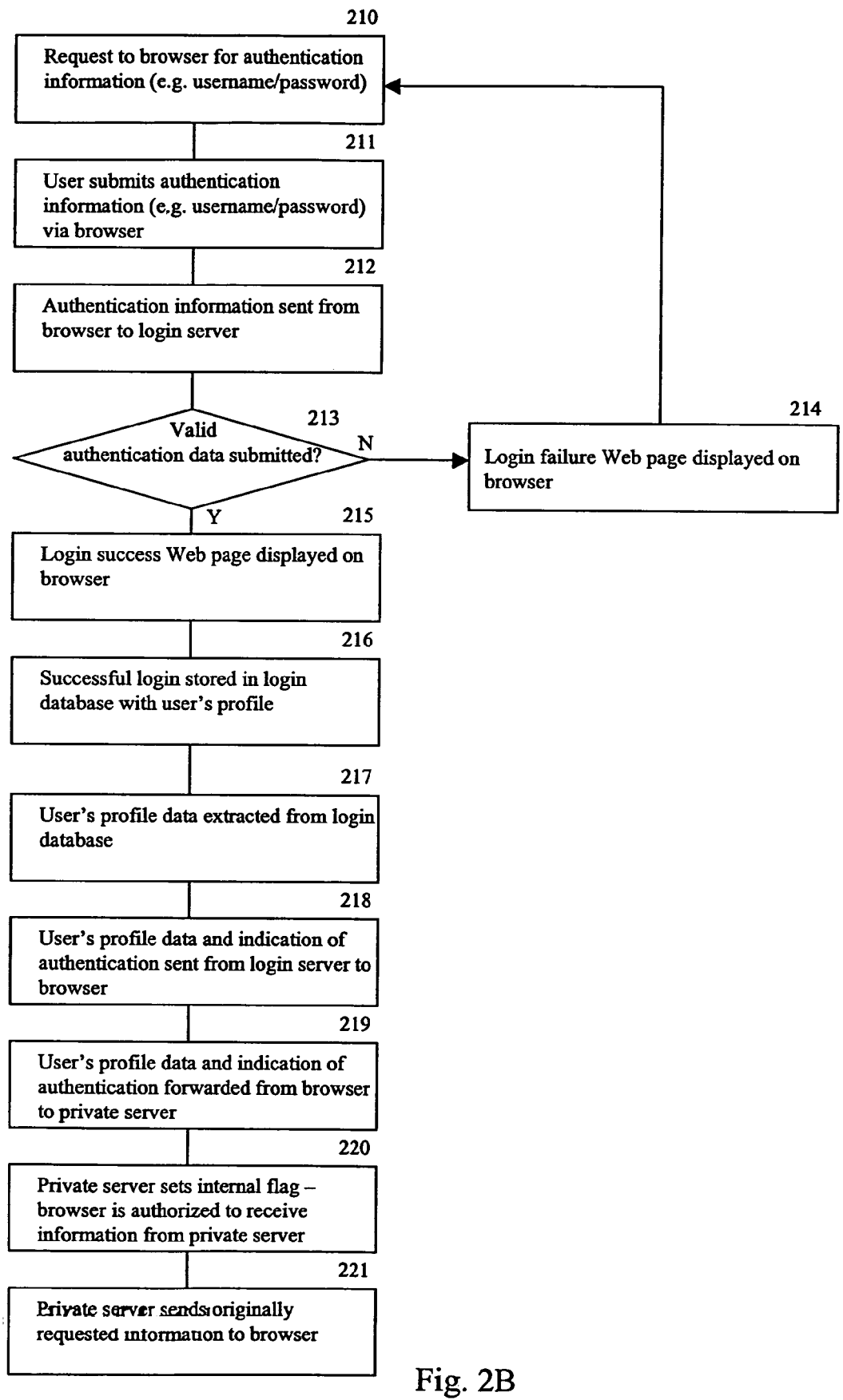
Figure 4C:
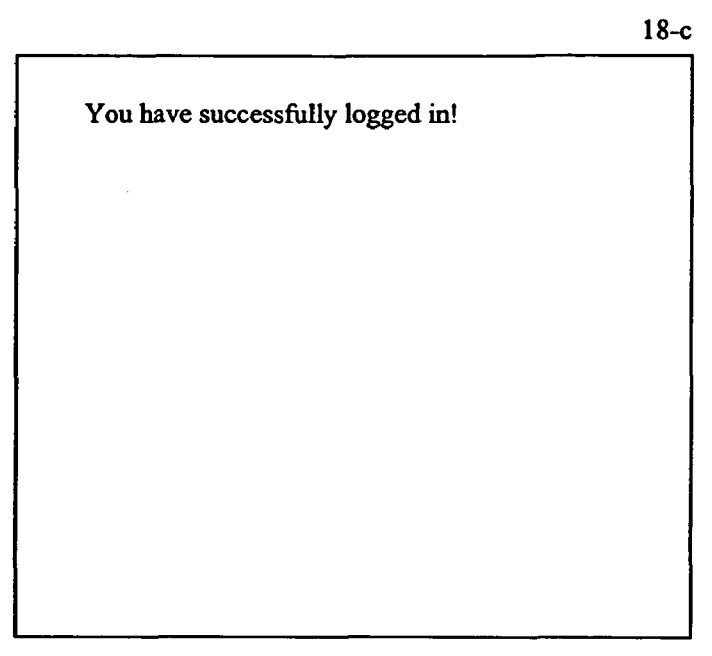

If the login server 12 does not find a unique session ID match in the login database 16, it proceeds to step 210 as shown in FIG. 2B. In step 210, the login server 12 sends a request through the network 40 to the browser 31 requesting the user to provide the proper authentication information (e.g., username and password). This is done by sending a web page 18a (FIG. 4A) from the login server 12 to the user's browser 31. This web page 18a provides a first blank field 18a-1 to be filed in with the username, a second blank field 18a-2 to be filled in with the password, and a graphical picture of a button 18a-3 that is user actuated to submit this information. In step 211, the user inputs respectively their username and password into the username field 18a-1 and password field 18a-2 on the Web page 18a (FIG. 4A) as displayed on the browser 31. Then the user clicks on the submit button 18a-3. In step 212, the username and password are sent in an encrypted form from the browser 31 to the login server 12. In step 213, the login server 12 receives the username and password through the network 40 and processes the information. In particular, the login server 12 searches the login database 16 for authentication information (e.g., username and password combination) that matches the current information submitted by the browser 31. If the current authentication information as submitted by the browser 31 does not match information stored in the login database 16, then the login server 12 determines the login attempt as a failure and then proceeds to step 214. In step 214, the login server 12 sends a Web page 18b (FIG. 4B) to the user's browser 31 which displays text 403 stating that the login was a failure and that the user should try again. The user is then returned to step 210, presenting the user with the web page 18a (FIG. 4A) requesting that they again enter their authentication information (e.g., username and password).

However, if the submitted authentication information (e.g., username and password) as submitted in step 211 matches authentication information stored in the login database 16, the login is determined successful, then the login server 12 continues to process the login as detailed in step 215. In step 215, the login server 12 sends a Web page 18c (FIG. 4C) to the user's browser 31 which displays text stating that the login was a success. In step 216, the login server 12 internally records that login was successful (e.g., providing a valid username and password). This is done by storing this information in the login database 16, along with the unique session ID as forwarded from the browser 31, including a unique identifier of the private server 20a, as well as the date and time of the login. This information is stored in the login database 16 with the user's profile. In step 217, the login server 12 extracts data items from the user's profile to be extracted and passed to the private server 20a. The login server 12 only extracts data from the user's profile that the user has previously authorized login server 12 to disclose to the particular private server 20a. In step 218, the user's data, including an indication of the fact that the user has been authenticated (e.g., by inputting a valid username and password) is sent in an encrypted form to the browser 31 through the network 40. Along with this information, are instructions to the browser 31 to pass this information from the browser 31 to the private server 20a as indicated in the redirect information. In step 219, the browser 31 receives the information, redirects instructions and processes the information, and forwards it to the private server 20a. In Step 220, the private server 20a, through its login manager 22, receives and processes the forwarded data as follows. The login manager 22 sets an internal Boolean flag indicating that the user is currently authenticated. The login manager 22 then forwards the profile data on to the part of the private server 20a that requires the personalized data. In step 220, the private server 20a sends the content originally requested in step 201 to the browser 31. In step 221, the browser 31 displays or processes the requested information.

Figure 4D:
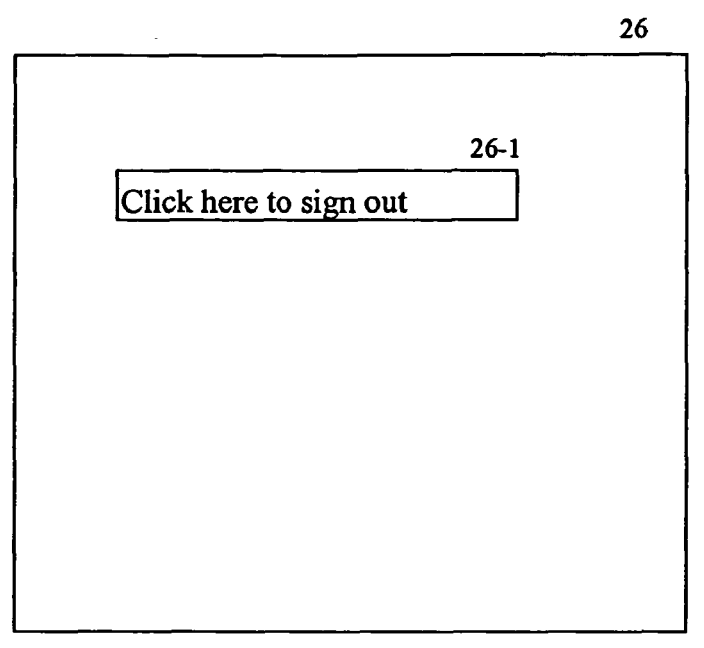

FIG. 3 illustrates a flow diagram of the process that enables single-signoff for a resource (e.g., user). In step 301, the user, through the browser 31, accesses a private server web page 26 (FIG. 4D) containing a "signoff" button through the network 40. This web page 26 is displayed on the user's browser 31. In step 302, the user, through the browser 31, selects or clicks on a graphical button 26-1 indicating signoff. In step 303, the browser 31 transmits the signoff request through the network 40 to the login server 12. In step 304, the login server 12 receives the signoff request and processes it as follows. The login server 12 accesses the user's profile data as stored in the login database 16 and retrieves the list of all of the private servers 20a-n to which the user is currently signed in. This list of current private server logins was stored earlier in the login database 16 as a result of the user signing in to each private server 20a-n (see FIG. 2, step 216). In step 305, the login server 12 sends the list of private servers 20a-n to which the user is currently signed in, through the network 40 to the browser 31 with instructions to direct a signoff request to each of the private servers 20a-n contained in the list. In step 306, the user's browser 31 processes the information as sent by the login server 12, and forwards instructions to each of the private servers 20a-n contained in the list that the user has logged off of the system 10. In step 307, each private server 20a-n contained in the list receives the signoff request from the browser 31 and indicates on its own system that the user has logged out and is no longer authenticated.

We claim:

1. A method performed by a login server, comprising:
receiving a request for a client system to access a first resource on a network;
authenticating that said client system has permission to access said first resource;
sending to said client system a first authentication message and an instruction for said client system to send said first authentication message to said first resource;
receiving a request for said client system to access a second resource on said network;
authenticating that said client system has permission to access said second resource;
sending to said client system a second authentication message and an instruction for said client system to send said second authentication message to said second resource;
receiving a request to log off said client system from all resources to which said client system is logged in; and
sending to said client system:
(A) a first log off message and an instruction for said client system to send said first log off message to said first resource; and
(B) a second log off message and an instruction for said client system to send said second log off message to said second resource.

2. A method, comprising:
receiving a request to log off a client system from all resources to which said client system is logged in, wherein said client system is logged into (i) a first resource on a network and (ii) a second resource on said network; and
sending to said client system:
(A) a first log off message and an instruction for said client system to send said first log off message to said first resource; and (B) a second log off message and an instruction for said client system to send said second log off message to said second resource.

3. A method performed by a client system, comprising:
sending a request to a login server for said client system to access a first resource on a network;
receiving a first authentication message and a first instruction for said client system to send said first authentication message to said first resource, wherein said first authentication message indicates that said client system has permission to access said first resource;
executing said first instruction;
sending a request to said login server for said client system to access a second resource on said network;
receiving a second authentication message and a second instruction for said client system to send said second authentication message to said second resource, wherein said second authentication message indicates that said client system has permission to access said second resource;
executing said second instruction;
sending a request to said login server to log off said client system from all resources to which said client system is logged in;
receiving a first log off message and an instruction for said client system to send said first log off message to said first resource;
executing said instruction to send said first log off message to said first resource;
receiving a second log off message and an instruction for said client system to send said second log off message to said second resource; and
executing said instruction to send said second log off message to said second resource.

4. A method performed by a client system, comprising:
sending a request to a login server to log off said client system from all resources to which said client system is logged in, wherein said client system is logged into (i) a first resource on a network and (ii) a second resource on said network; and
receiving a first log off message and a first instruction for said client system to send said first log off message to said first resource;
executing said first instruction;
receiving a second log off message and a second instruction for said client system to send said second log off message to said second resource; and
executing said second instruction.

5. A method performed by a login server, comprising:
receiving a request for a client system to access a first resource on a network;
authenticating that said client system has permission to access said first resource;
sending to said client system a first authentication message and an instruction for said client system to send said first authentication message to said first resource;
receiving a request for said client system to access a second resource on said network;
authenticating that said client system has permission to access said second resource;
sending to said client system a second authentication message and an instruction for said client system to send said second authentication message to said second resource;
receiving a request to log off said client system from resources to which said client system is logged in; and
sending to said client system:
 (A) a first log off message and an instruction for said client system to send said first log off message to said first resource; and
 (B) a second log off message and an instruction for said client system to send said second log off message to said second resource.

6. A method, comprising:
receiving a request to log off a client system from resources to which said client system is logged in, wherein said client system is logged into (i) a first resource on a network and (ii) a second resource on said network; and
sending to said client system:
 (A) a first log off message and an instruction for said client system to send said first log off message to said first resource; and
 (B) a second log off message and an instruction for said client system to send said second log off message to said second resource.

7. A method performed by a client system, comprising:
sending a request to a login server to log off said client system from resources to which said client system is logged in, wherein said client system is logged into (i) a first resource on a network and (ii) a second resource on said network; and
receiving a first log off message and a first instruction for said client system to send said first log off message to said first resource;
executing said first instruction;
receiving a second log off message and a second instruction for said client system to send said second log off message to said second resource; and
executing said second instruction.

* * * * *